US008285893B2

(12) United States Patent
Rispoli et al.

(10) Patent No.: US 8,285,893 B2
(45) Date of Patent: Oct. 9, 2012

(54) SYSTEM AND METHOD FOR ADAPTIVELY SETTING CONNECTIONS TO INPUT/OUTPUT HUBS WITHIN AN INFORMATION HANDLING SYSTEM

(75) Inventors: Joseph V. Rispoli, Round Rock, TX (US); Thai H. Nguyen, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 950 days.

(21) Appl. No.: 11/580,597

(22) Filed: Oct. 13, 2006

(65) Prior Publication Data

US 2008/0159321 A1 Jul. 3, 2008

(51) Int. Cl.
*G06F 3/00* (2006.01)
*G06F 5/00* (2006.01)
*H04L 12/28* (2006.01)
*H04L 12/56* (2006.01)

(52) U.S. Cl. ......................................... 710/38; 370/419
(58) Field of Classification Search ...................... 710/38
See application file for complete search history.

(56) References Cited

U.S. PATENT DOCUMENTS

| | | | |
|---|---|---|---|
| 3,665,404 A * | 5/1972 | Werner ........................ 710/262 |
| 6,912,612 B2 | 6/2005 | Kapur et al. | |
| 6,959,364 B2 | 10/2005 | Safranek et al. | |
| 6,976,129 B2 | 12/2005 | Creta et al. | |
| 7,290,128 B2 | 10/2007 | Habib | |
| 7,644,293 B2 * | 1/2010 | Sistla et al. ................... 713/323 |
| 7,676,603 B2 * | 3/2010 | Creta et al. ......................... 710/5 |
| 2004/0003184 A1 * | 1/2004 | Safranek et al. .............. 711/146 |
| 2005/0005062 A1 * | 1/2005 | Liu et al. ........................ 711/112 |
| 2006/0294317 A1 * | 12/2006 | Berke ........................... 711/141 |
| 2007/0011383 A1 | 1/2007 | Berke et al. | |
| 2007/0067551 A1 * | 3/2007 | Ikeda et al. ................... 710/315 |
| 2007/0143511 A1 * | 6/2007 | Daly et al. .................... 710/110 |

* cited by examiner

*Primary Examiner* — Chun-Kuan Lee
*Assistant Examiner* — Brooke Taylor
(74) *Attorney, Agent, or Firm* — Baker Botts L.L.P.

(57) ABSTRACT

A system and method is disclosed in which a switch is located between the I/O hubs of the computer system. The I/O hubs are coupled to I/O devices of the computer system. The I/O hubs are also coupled to one or more processors via direct point-to-point communication links. The I/O hub provides a connection point between various I/O devices and processors. The switch includes a set of internal communications pathways that can be set according to the communication status of links between the processors and I/O hubs of the system. When the communication links of the system are operational, the switch allocates all of I/O hub transmission bandwidth to I/O devices. When the communication links are determined to be not operational, the switch allocates some of I/O hub transmission bandwidth to establish a communication link between the I/O hubs of the computer system, while the remaining I/O hub transmission bandwidth is allocated to I/O devices.

19 Claims, 4 Drawing Sheets

SYSTEM AND METHOD FOR ADAPTIVELY SETTING CONNECTIONS TO INPUT/OUTPUT HUBS WITHIN AN INFORMATION HANDLING SYSTEM

TECHNICAL FIELD

The present disclosure relates generally to computer systems and information handling systems, and, more particularly, to a system and method for adaptively setting connections to I/O hubs within an information handling system

BACKGROUND

As the value and use of information continues to increase, individuals and businesses seek additional ways to process and store information. One option available to these users is an information handling system. An information handling system generally processes, compiles, stores, and/or communicates information or data for business, personal, or other purposes thereby allowing users to take advantage of the value of the information. Because technology and information handling needs and requirements vary between different users or applications, information handling systems may vary with respect to the type of information handled; the methods for handling the information; the methods for processing, storing or communicating the information; the amount of information processed, stored, or communicated; and the speed and efficiency with which the information is processed, stored, or communicated. The variations in information handling systems allow for information handling systems to be general or configured for a specific user or specific use such as financial transaction processing, airline reservations, enterprise data storage, or global communications. In addition, information handling systems may include or comprise a variety of hardware and software components that may be configured to process, store, and communicate information and may include one or more computer systems, data storage systems, and networking systems.

An information handling system may include multiple processors and multiple input/output (I/O) hubs (IOHs). IOHs are commercially available microchips designed to connect various I/O devices to processors and memory. Each IOH may include a number of PCI Express (PCIe) ports for connecting various I/O devices. In a system that includes two or more IOHs, the IOHs may be coupled to one another using a PCIe link. In this architectural example, if one of the IOHs loses its direct link to its connected processors, the IOH-to-IOH link is used as the path between the IOH and its previously connected processors. If the connection between the two IOHs is hard wired, however, there will be fewer available PCIe ports for connecting I/O devices. If all of the IOH PCIe ports are dedicated to connecting I/O devices, however, the reliability, availability, and serviceability advantages of directly coupling the IOHs together are lost.

SUMMARY

In accordance with the present disclosure, a system and method is disclosed in which a switch is located between the I/O hubs of the computer system. The switch is coupled to the I/O hubs. The I/O hubs are coupled to various I/O devices of the computer system. The I/O hubs are also coupled to processors via direct point-to-point communication links. The I/O hub provides a connection point between various I/O devices and processors. The switch includes a set of internal communications pathways that can be set according to the status of the direct point-to-point communication links between processors and I/O hubs. When each I/O hub in a system has at least one direct point-to-point link to a processor, the switch would be set to connect all PCI Express lanes to I/O devices, thereby optimizing the overall system bandwidth. When any I/O hub in a system loses all of its links to processors, the switch would be set to create a point-to-point link between I/O hubs in the system, thereby optimizing reliability, availability, and serviceability of the system. The bandwidth required for the IOH-to-IOH connection would be reallocated from one or more links between the switch and the I/O hubs.

The system and method disclosed herein is technically advantageous because it provides increased flexibility for a system to maximize I/O accessibility while maintaining overall reliability, availability, and serviceability. If an I/O hub fails to directly couple to a processor, a direct point-to-point link between the I/O hubs can be established, thereby providing a path for I/O devices on the uncoupled I/O hub to access processors and memory. The system and method disclosed herein is also adaptive in that the switch only provides for a direct point-to-point link between the I/O hubs during the state of an I/O hub failure to find a direct link to a processor. If one or more of the direct links between processor and I/O hub are operational, the switch does not direct connect the I/O hubs, but rather makes available all PCIe lanes to I/O devices. Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

Figure 1:
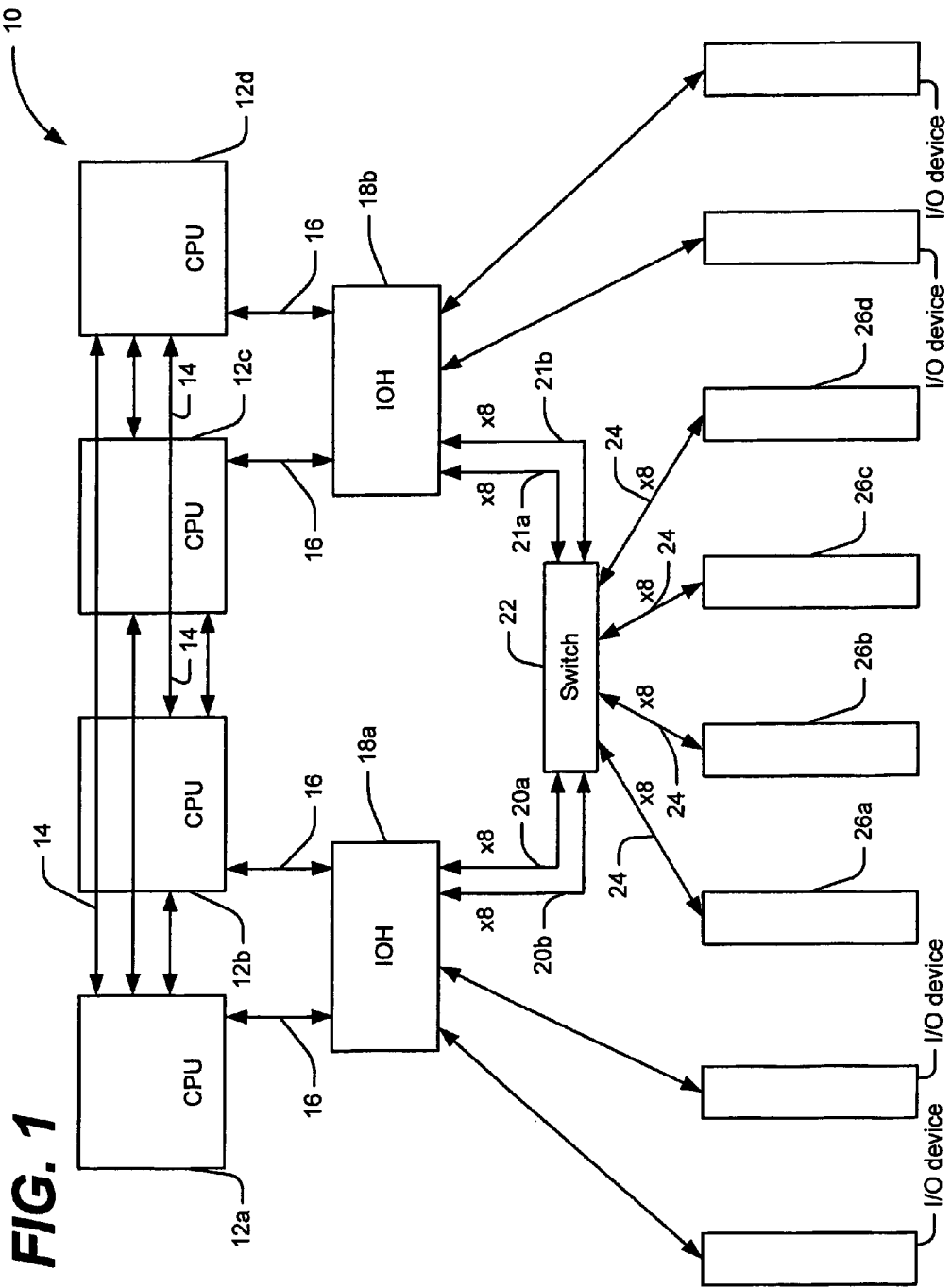
FIG. 1 is a diagram of a multiprocessor computer system.

Shown in FIG. 1 is a diagram of a multiprocessor computer system, which is indicated generally at 10. System 10 includes four processors, which are shown at 12a, 12b, 12c, and 12d. Each processor 12 is directly connected to every other processor by a point-to-point link 14. Each processor 12 is also coupled through a point-to-point link 16 to one I/O hub (IOH) 18. A point-to-point link establishes an electrical coupling channel between the two components. In the example of FIG. 1, processor 12a and processor 12b are coupled to IOH 18a; and processor 12c and processor 12d are coupled to IOH 18b. Each IOH operates as a communication hub between the processor and a set of I/O devices of the computer system. In the system of FIG. 1, each IOH 18 is coupled to a switch 22 by two x8 PCI Express (PCIe) links. The term x8 specifies the eight lane width of the PCI Express link. IOH 18a is coupled to switch 22 by x8 PCIe links 20a and 20b, and IOH 18b is coupled to switch 22 by x8 PCIe links 21a and 21b. Switch 22 is also coupled through PCIe links 24 to I/O devices 26a, 26b, 26c, and 26d.

In operation, IOHs continuously monitor the status of their point-to-point links to processors. A critical link failure would be logged by the IOH. In addition, an alert signal could be sent to a system management controller or any other devices in the system. The status of the point-to-point links between the processors and each IOH is communicated by each IOH to switch 22. Shown in FIG. 2 is a diagram of the routing of PCI Express lanes and the internal connections within switch 22 at a time when the point-to-point links between the IOHs and the processors are active and operational.

Figure 2:
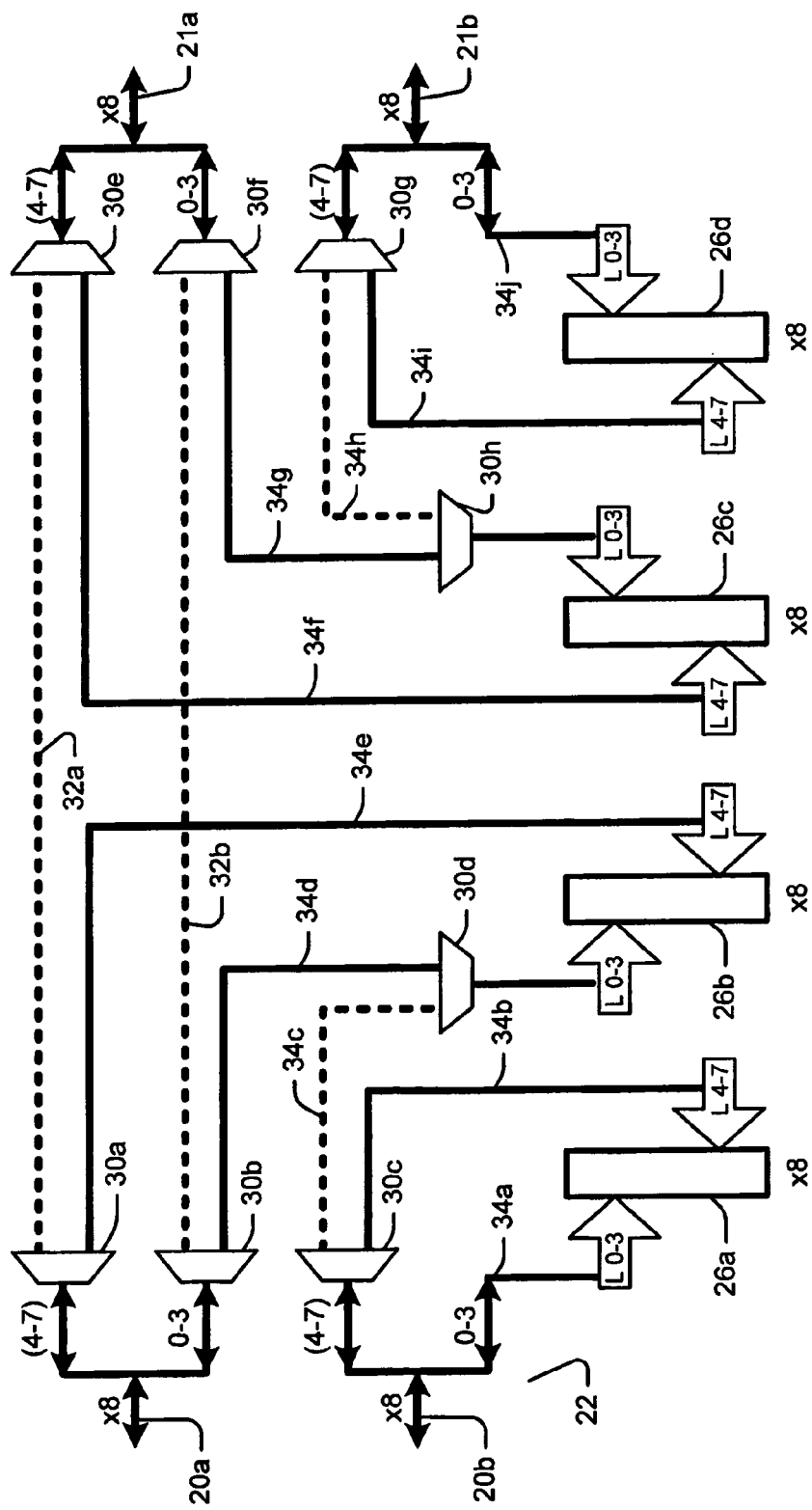
FIG. 2 is a diagram of the routing of the internal connections within a switch during the state in which all I/O hubs in a system have a direct link to a processor.

In the internal switch diagram of FIG. 2, the active PCI express links are shown in solid lines and the inactive PCI express links are shown in dashed lines. In this mode of operation, all eight lanes of the PCI Express link 20a are passed to I/O device 26b. Lanes 0-3 of link 20a are passed through hubs 30b and 30d to device 26b. Lanes 4-7 of link 20a are passed through hub 30a to device 26b. All eight lanes of the PCI Express link 20b are passed to I/O device 26a. Lanes 0-3 of link 20b are coupled directly to device 26a Lanes 4-7 of link 20b are passed through hub 30c to device 26a. All eight lanes of the PCI Express link 21a are passed to I/O device 26c. Lanes 0-3 are passed through hubs 30f and 30h to device 26c. Lines 4-7 are passed through hub 30e to device 26c. All eight lanes of the PCI Express link 21b are passed to I/O device 26d. Lanes 0-3 are coupled directly to device 26d. Lanes 4-7 are passed through hub 30g to device 26d. In this mode of operation, the switch routes the entire width of each PCI Express link 20 and 21 to one of the I/O devices of the system. In this configuration, the I/O hub-to-I/O hub link is not established.

Figure 3:
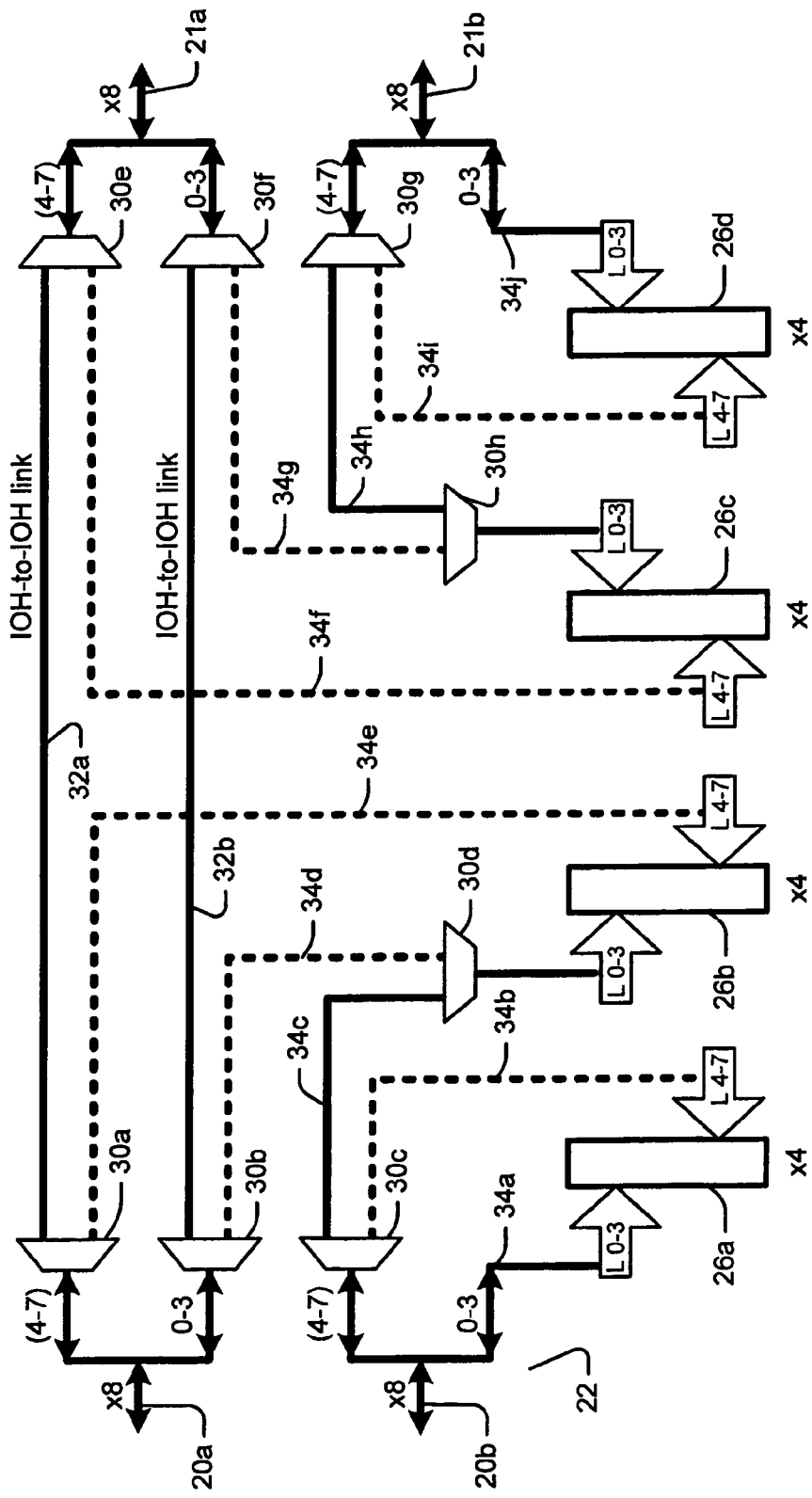
FIG. 3 is a diagram of the routing of the internal connections within a switch during the state of an I/O hub failure to find a direct link to a processor.

If, however, an I/O hub fails to find a direct link to a processor, the internal connections within switch 22 are reassigned to provide for a direct link between the IOHs, as shown in FIG. 3. In the configuration of FIG. 3, the connection between hub 30a and hub 30e is enabled, and the connection between hub 30b and hub 30f is enabled. This configuration creates a pathway to connect eight lanes of PCIe link 20a to eight lanes of PCIe link 21a, thereby establishing an I/O hub-to-I/O hub link. Because 16 lanes are used to create the I/O hub-to-I/O hub link, fewer lanes are available to I/O devices. The connection widths to each of the I/O devices are reduced in size to four lanes. As shown in FIG. 3, four lanes from link 20b are directed to each of device 26a and device 26b. Likewise, four lanes from link 21b are directed to each of device 26c and device 26d. In the configuration of FIG. 3, and with reference to the architectural diagram of FIG. 1, if an I/O hub fails to find a direct link to a connected processor, the x8-wide link within switch 22 is established to provide a path for this I/O hub to access processors in the system through the other IOH in the system.

Figure 4:
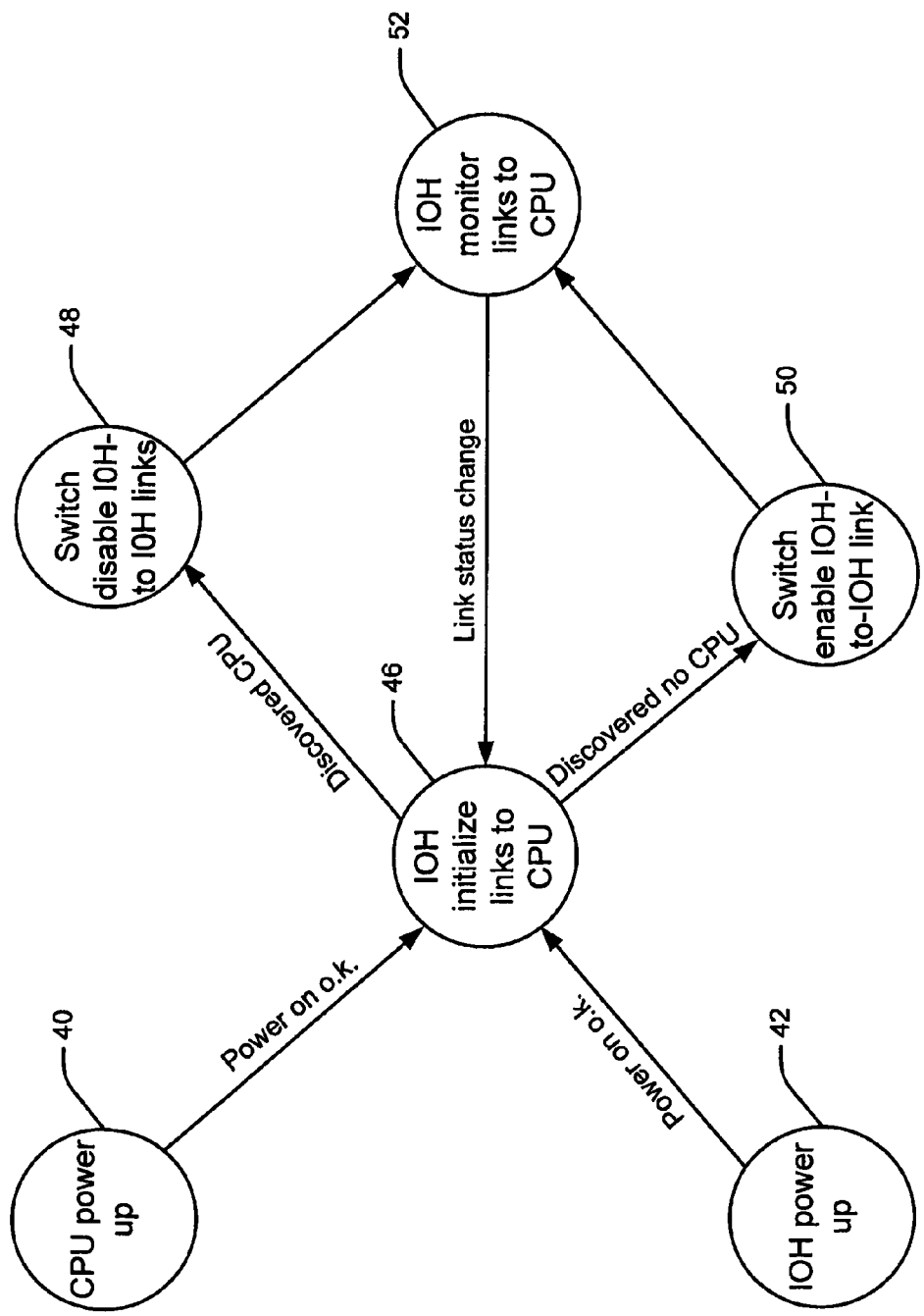
FIG. 4 is a flow diagram of a method for enabling or disabling the I/O-hub-to-I/O-hub link within the switch based on the I/O hub-to-process link status within the system

Shown in FIG. 4 is a flow diagram of a method of steps for enabling or disabling the I/O hub-to-I/O hub link on the basis of the status of the I/O hub-to-processor links within the system. During the power up sequence, the I/O hubs and processors are powered on and subsequently initialize their respective communication links to other components. At step 40, each processor of the system powers up, and, at step 42, each IOH of the system powers up. After each of these components successfully powers up, the IOHs of the system attempt to initialize the links to the CPU at step 46. For each IOH, if its dedicated CPUs are discovered at step 46, the startup process branches to step 48, and the IOH-to-IOH link within the switch is disabled. Otherwise, the startup process branches to step 50, where the IOH-to-IOH link within the switch is enabled.

Also shown in FIG. 4 are a series of method steps associated with the monitoring of the links between the processors and each IOH of the system. Following the disabling or enabling of the IOH-to-IOH link with in the switch, the IOHs of the system continue to monitor the links between the processors and each respective IOH link, as indicated at step 52.

When the status of a link between a processor and an IOH changes, the monitoring process branches to step 46, where the discovery process evaluates whether the links between the processors are discovered or not discovered. If all of the links between the processors and the respective IOHs are discovered, the processing continues with the disablement of the IOH-to-IOH link in the switch at step 48. If at least one of the links between the processor and the respective IOHs is not discovered, the IOH-to-IOH link within the processors is enabled at step 50. Following step 48 or step 50, the monitoring process continues at step 52.

As shown in FIG. 4, the system and method described herein is adaptive in that the system can enable or disable an internal link in the switch to compensate for conditions within the larger system. The adaptive features of the system and method described herein promote I/O accessibility while maintaining survivability of the system in the event of critical link failure. It should be recognized that the system disclosed herein is limited in its operation to a system that includes a common system interface and PCIe communications links. Rather, the system and method disclosed herein may be employed with any system, regardless of the communications protocol employed. Although the present disclosure has been described in detail, it should be understood that various changes, substitutions, and alterations can be made hereto without departing from the spirit and the scope of the invention as defined by the appended claims.

What is claimed is:

1. An information handling system, comprising:
a plurality of processors, wherein each of the processors has a direct communications link to each of the other processors;
first and second I/O controller hub devices, wherein each of the processors is coupled to at least one of the I/O controller hub devices, and at least one of the processors has a direct communications link to at least one of the I/O controller hub devices;
and a switch device coupled to the first I/O controller hub device by a first communications link and coupled to the second I/O controller hub device by a second communications link, wherein the first communications link comprises a defined transmission bandwidth and the second communications links comprises the defined transmission bandwidth, wherein the switch device engages and disengages a set of internal communications pathways depending on the status of the direct communications link between at least one of:

(1) the processors and 2) the first or second I/O controller hub devices;

wherein the switch device is operable to engage an internal communications pathway within the switch device to provide a communications pathway between the first and second I/O controller hub in a first state and is operable to disengage the internal communications pathway within the switch device such that the first and second I/O controller hub are not coupled through the switch device in a second state;

wherein the internal communications pathway within the switch device comprises the defined transmission bandwidth.

2. The information handling system of claim 1, wherein the communications links between each of the processors and the communications links between the processors and the first and second I/O controller hub are point-to-point link based interconnects.

3. The information handling system of claim 1, wherein the switch device is coupled to the first I/O controller hub device by two communications links, wherein each of the communications links has a defined transmission bandwidth;

wherein the switch device is coupled to the second I/O controller hub device by two communications links, wherein each of the communications links has a defined transmission bandwidth;

and wherein the engagement of the internal communications pathway within the switch device results in a communications pathway that has the same transmission bandwidth as each one of the communications links that is coupled to the switch device.

4. The information handling system of claim 3, wherein the engagement of the internal communications pathway within the switch device results in a communications pathway that has the same transmission bandwidth as each of the communications links coupled between the switch device and each of the first and second I/O controller hub.

5. The information handling system of claim 1, wherein the switch device is coupled to a plurality of I/O devices through a communications link having a defined transmission bandwidth;

and wherein, when the switch device is in the second state, the switch disengages the internal communications pathway within the switch device such that the first and second I/O controller hub are not coupled to one another through the switch device and wherein the switch device provides for a communication pathway between the first and second I/O controller hub and the I/O devices.

6. The information handling system of claim 5, wherein, when the switch is in the second state, the communications pathway between the switch and the I/O devices has the same transmission bandwidth as each one of the communications links that is coupled to the switch device.

7. The information handling system of claim 5, wherein, when the switch is in the first state, the communications pathway between the switch and each I/O device has a transmission bandwidth that is one-half of the transmission bandwidth of each one of the communications links that is coupled to the switch device.

8. The information handling system of claim 5, wherein the communications links between each of the processors and the communications links between the processors and the first and second I/O controller hub are point-to-point link based interconnects.

9. A method for managing communications links with a computer system, the computer system comprising a plurality of processors, each of which is directly coupled to one another through a set of direct communications links, and first and second I/O controller hub, wherein each of the processors is coupled to at least one of the I/O controller hubs through at least one direct communications link, and a switch device coupled to the first I/O controller hub by a first communications link and coupled to the second I/O controller hub by a second communications link, wherein the first communications link comprises a defined transmission bandwidth and the second communications link comprises the defined transmission bandwidth, comprising:

determining if the direct communications links between the processors and said at least one I/O controller hub are operational;

if none of the direct communications links from between the processors and said at least one I/O controller hub are determined to be operational, engaging or leaving in a state of engagement a set of internal communications pathways within the switch to provide a direct communications link within the switch between the first and second I/O controller hubs, wherein the internal communications pathway within the switch device comprises the defined transmission bandwidth:

and if any of the direct communications links between the processors and said at least one I/O controller hub is determined to be operational, disengaging or leaving in a state of disengagement a set of internal communications pathways within the switch such that a direct communications link within the switch is not provided between the first and second I/O controller hubs.

10. The method for managing communications links with a computer system of claim 9, wherein, when the switch is configured to provide a direct communications link within the switch between the first and second I/O controller hub, the direct communications link within the switch has the same communications bandwidth as one of the communications links coupled between the switch and the first and second I/O controller hub.

11. The method for managing communications links with a computer system of claim 10, wherein, when the switch is not configured to provide a direct communications link within the switch between the first and second I/O controller hub, the switch is coupled to a plurality of I/O devices such that the first and second I/O controller hub are coupled to the I/O devices.

12. The method for managing communications links with a computer system of claim 11, wherein, when the switch is configured to provide a direct communications link within the switch between the first and second I/O controller hub, the switch is coupled to a plurality of I/O devices such that the communications pathway between the switch and each I/O device has a transmission bandwidth that is one-half of the transmission bandwidth of one of the communications links coupled between the switch and the first and second I/O controller hub devices.

13. The method for managing communications links with a computer system of claim 12, wherein the communications links between each of the processors and the communications links between the processors and the first and second I/O controller hub are point-to-point link based interconnects.

14. A multiprocessor computer system having a set of failover communications links, comprising:
- a plurality of processors, wherein each of the processors has a direct communications link to each of the other processors;
- first and second I/O controller hub, wherein each of the processors is coupled to at least one of the I/O controller hubs, and at least one of the processors has a direct communications link to at least one of the I/O controller hubs;
- and a switch device coupled to the first I/O controller hub by a first communications link and coupled to the second I/O controller hub by a second communications link, wherein the first communications link comprises a defined transmission bandwidth and the second communications link comprises the defined transmission bandwidth,
- wherein the switch device engages and disengages a set of internal communications pathways depending on the status of the communications links between the plurality of processors and the first and second I/O controller hub, wherein the internal communications pathways within the switch device comprise the defined transmission bandwidth;
- wherein the switch is in a first state if none of communications links from said at least one of the I/O controller hubs to the plurality of processors are operable;
- wherein the switch is in a second state if any of the communications links from said at least one of the I/O controller hubs to the plurality of processors are operable;
- wherein in the first state the switch engages an internal communications pathway within the switch device to provide a communications pathway between the first and second I/O controller hub;
- and wherein in the second state the switch disengages the internal communications pathway within the switch device such that the first and second I/O controller hub are not coupled through the switch device.

15. The multiprocessor computer system of claim 14, wherein, when the computer system is in a first state, the communications pathway between the switch and each I/O devices has a transmission bandwidth that is one-half of the transmission bandwidth of each one of the communications links that is coupled to the switch device.

16. The multiprocessor computer system of claim 14, wherein the switch is coupled to a plurality of I/O devices.

17. The multiprocessor computer system of claim 14, wherein, when the computer system is in a second state, the communications pathway between the switch and each I/O devices has a transmission bandwidth that is the same as the transmission bandwidth of each one of the communications links that is coupled to the switch device.

18. The multiprocessor computer system of claim 14, wherein the communications links between each of the processors and the communications links between the processors and the first and second I/O controller hub devices are point-to-point link based interconnects.

19. An information handling system, comprising:
- a plurality of processors, wherein each of the processors has a direct communications link to each of the other processors;
- a plurality of I/O controller hub devices, wherein each of the processors is coupled to at least one of the I/O controller hub devices, and at least one of the processors has a direct communications link to at least one of the I/O controller hub devices;
- and a switch device coupled to each of the I/O controller hub devices by at least one first communications link comprising a defined transmission bandwidth, wherein the switch is coupled to a plurality of I/O devices;
- wherein the switch device engages and disengages a set of internal communications pathways depending on the status of the communications links between the plurality of processors and the plurality of I/O controller hub devices, wherein the internal communications pathways within the switch device comprise the defined transmission bandwidth;
- and wherein the switch device is operable to engage an internal communications pathway within the switch device to provide a communications pathway between the plurality of I/O controller hub devices in a first state and is operable to disengage the internal communications pathway within the switch device such that the plurality of I/O controller hub devices are not coupled through the switch device.

* * * * *